A. L. ADAMS.
SHOVEL.
APPLICATION FILED APR. 14, 1916.
1,233,435.
Patented July 17, 1917.
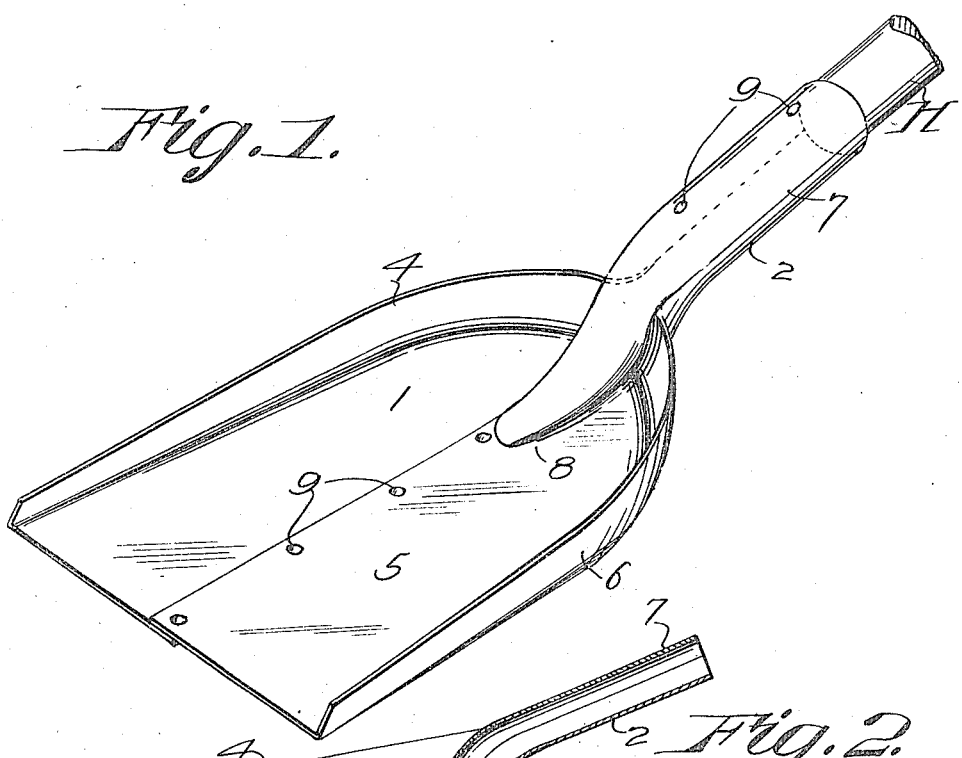
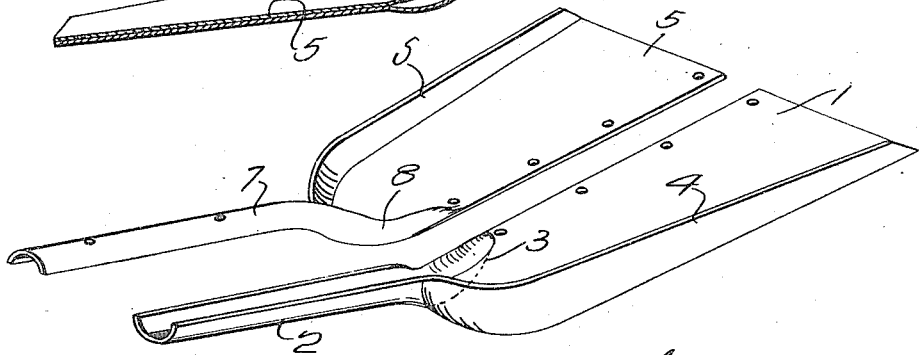
Witnesses
Albert L. Adams,
Inventor
by C.A. Snow & Co.
Attorneys

UNITED STATES PATENT OFFICE.

ALBERT L. ADAMS, OF CEDAR RAPIDS, IOWA.

SHOVEL.

1,233,435.     Specification of Letters Patent.     Patented July 17, 1917.

Application filed April 14, 1916. Serial No. 91,247.

*To all whom it may concern:*

Be it known that I, ALBERT L. ADAMS, a citizen of the United States, residing at Cedar Rapids, in the county of Linn and State of Iowa, have invented a new and useful Shovel, of which the following is a specification.

This invention relates to shovels, one of the objects being to provide a shovel made up of two opposed sheet metal members which lap along their inner edges, they being secured together at points where they lap and said lapping portions constituting a longitudinal reinforce whereby the shovel is prevented from buckling.

A further object is to provide a shovel the sections of which are provided with integral socket portions, these socket portions being oppositely disposed so that when the two parts of the shovel are assembled, a complete handle receiving socket is provided.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—

Figure 1 is a perspective view of a shovel embodying the present improvements.

Fig. 2 is a central longitudinal section therethrough.

Fig. 3 is a perspective view of the shovel and showing its parts separated.

Referring to the figures by characters of reference 1 designates a shovel section having substantially the form of one half a shovel, this section being provided at its back end with an inclined transversely bowed stem 2, there being a longitudinal depression within the section where it is joined by the stem. A flange 4 extends along the outer side of the section 1 and around the back thereof and merges into one side of the stem 2. Another shovel section has been indicated at 5 and is provided along its outer and back edges with a flange 6 similar to the flange 4, this flange merging into a stem 7 which is integral with the shovel section 5 and is bowed transversely, the same being disposed oppositely to the stem 2 and merging into a rib 8 which is formed on the top of the section 5 close to the inner edge thereof. Obviously the two sections of the shovel with their stems can be readily stamped from sheet metal and after they have been thus produced they are adapted to be placed in lapped relation, as shown particularly in Fig. 1, the lapping portions of the sections being held together either by means of rivets 9, or by welding, or in any other suitable manner. When the sections are thus assembled the superposed stems 2 and 7 will coöperate to form a substantially cylindrical handle socket and the handle H may be inserted into this socket and held thereto by rivets 9 extending through the stems 2 and 7 and through the handle. When these rivets are in position the stems will be fastened securely together and will also be caused to bind tightly on the handle. It is to be understood of course that other means than those described may be employed for fastening together the stems 2 and 7. When the two sections of the shovel are assembled the rib or bead 8 will extend over and match with the depression 3. Thus the shovel will be reinforced at the back by the bead 8 and the walls of the depression 3 and will be reinforced longitudinally by reason of the double thickness of metal produced by lapping the inner edge portions of the two sections 1 and 5.

What is claimed is:—

1. A shovel comprising opposed sections lapping along the longitudinal center of the shovel to form a reinforce.

2. A shovel including opposed sections, opposed stems integral with the respective sections and disposed in superposed relation to form a handle receiving socket, and means for fastening said stems together.

3. A shovel including opposed sections lapping along their inner edges to form a central longitudinal reinforce, and superposed stems extending from the respective sections and coöperating to form a handle receiving socket.

4. A shovel including opposed sections lapping along their inner edges to form a central longitudinal reinforce, stems projecting from the back ends of the respective sections and integral therewith, said stems being superposed and oppositely disposed and coöperating to form a handle receiving socket, and means for fastening the stems together.

5. A shovel including opposed sections lapping along their inner edges to form a central longitudinal reinforce, stems projecting from the back ends of the respective sections and integral therewith, said stems being superposed and oppositely disposed and coöperating to form a handle receiving socket, and means for fastening the stems together, said stems merging into offset reinforcing portions upon the back portions of the respective sections.

6. A shovel including connected side sections, opposed stems carried by the respective sections and coöperating to form a handle receiving socket, and means for fastening the stems together and to an inserted handle, said side sections being extended throughout the length of the shovel.

7. A shovel including opposed sections lapping along their inner edges to form a longitudinal reinforce, and stems extending from the respective sections and coöperating to form a handle receiving socket.

In testimony that I claim the foregoing as my own, I have hereto affixed my signature in the presence of two witnesses.

ALBERT L. ADAMS.

Witnesses:
H. E. ANTHONY,
B. H. HEBBARD.

Copies of this patent may be obtained for five cents each, by addressing the "Commissioner of Patents, Washington, D. C."